United States Patent [19]
Steigerwald

[11] Patent Number: 5,060,130
[45] Date of Patent: Oct. 22, 1991

[54] HIGH-EFFICIENCY, HIGH-DENSITY, POWER SUPPLY INCLUDING AN INPUT BOOST POWER SUPPLY

[75] Inventor: Robert L. Steigerwald, Burnt Hills, N.Y.

[73] Assignee: General Electric Company, Schenectady, N.Y.

[21] Appl. No.: 571,382

[22] Filed: Aug. 23, 1990

[51] Int. Cl.$^5$ .......................................... H02M 3/335
[52] U.S. Cl. ....................................... 363/65; 363/17; 363/71; 363/124; 363/132
[58] Field of Search ................... 363/17, 98, 124, 132, 363/65, 11

[56] References Cited

U.S. PATENT DOCUMENTS

| | | | |
|---|---|---|---|
| 4,086,621 | 4/1978 | Vukasovic | 363/136 |
| 4,533,986 | 8/1985 | Jones | 363/98 |
| 4,658,344 | 4/1987 | Romandi | 363/136 |
| 4,672,528 | 6/1987 | Park et al. | 363/98 |
| 4,686,615 | 8/1987 | Ferguson | 363/17 |
| 4,742,535 | 5/1988 | Hino et al. | 363/17 |
| 4,763,237 | 8/1988 | Wieczorek | 363/124 |
| 4,805,081 | 2/1989 | Chambers et al. | 363/136 |
| 4,934,822 | 6/1990 | Higaki | 363/98 |
| 4,939,381 | 7/1990 | Shibata et al. | 363/98 |
| 4,967,333 | 10/1990 | Callier et al. | 363/17 |

OTHER PUBLICATIONS

R. L. Steigerwald, "A Comparison of Half-Bridge Resonant Converter Topologies", IEEE Transactions on Power Electronics, Apr. 1988, pp. 174–182.

*Primary Examiner*—Steven L. Stephan
*Assistant Examiner*—Jeffrey Sterrett
*Attorney, Agent, or Firm*—Jill M. Breedlove; James C. Davis, Jr.; Marvin Snyder

[57] ABSTRACT

A power supply includes a dc-to-dc converter with an integral boost power supply for maintaining the effective converter input voltage within a predetermined steady-state range, even if the input voltage to the power supply exhibits substantial voltage transients. In one preferred embodiment, the boost power supply comprises a boost transformer and a rectifier, and the converter comprises two parallel-coupled resonant converter modules, each including either a half-bridge or full-bridge connection of switching devices and a resonant circuit. The primary winding of the boost transformer is coupled between the junctions joining the switching devices of the resonant converter bridges. When the power supply input voltage is outside the steady-state voltage range, the boost power supply is activated by phase shift control of the voltage across the primary winding of the boost transformer.

20 Claims, 5 Drawing Sheets

HIGH-EFFICIENCY, HIGH-DENSITY, POWER SUPPLY INCLUDING AN INPUT BOOST POWER SUPPLY

FIELD OF THE INVENTION

The present invention relates generally to power supplies. More particularly, the present invention relates to a high-efficiency, high-density, power supply including a dc-to-dc converter with an integral boost power supply for maintaining the converter input voltage within its steady-state range.

BACKGROUND OF THE INVENTION

In an exemplary distributed power system, a single, relatively high power supply converts input line voltage to a semi-regulated voltage which is then supplied to a multitude of individual "point-of-load" power supplies located at the loads to be served. Power is usually distributed to the point-of-load supplies along the back-plane of a modular assembly, and the relatively high power supply is thus often referred to as a "back-plane" power supply. Typically, the back-plane supply has its input derived from a prime power source which may exhibit substantial voltage transients. The back-plane supply must continuously supply the regulated power to the point-of-load supplies despite these normal transient disturbances. In a military application of distributed power, for example, the prime power is often specified to be that defined by military standard MIL-STD-704D. The steady-state input voltage defined by this standard is in the range from 250 to 280 Vdc. However, under this standard, normal dc operation is defined as including an envelope of voltage transients that can make the effective input voltage vary between 125 and 475 Vdc. Unfortunately, however, high-frequency power supply topologies which meet the aforementioned input voltage range requirement while still maintaining high-efficiency, steady-state operation have been heretofore unavailable. In particular, as the lower limit of the voltage range requirement decreases, efficiency decreases. For example, in a resonant circuit topology, which advantageously enables operation at high frequencies and hence the use of small circuit components, the decrease in efficiency is primarily due to the fact that peak circulating currents in the resonant components and primary-side active devices are determined by the minimum voltage requirement. Since the peak circulating currents are higher for a lower voltage requirement, and the circulating currents remain relatively constant for voltages above the minimum voltage requirement, conduction losses increase as the minimum voltage requirement decreases. Alternatively, to minimize losses, components can be made larger, but at the expense of power density. Therefore, it would be desirable to provide a high-density power supply for supplying a regulated output voltage at high efficiency even for an input voltage which may exhibit substantial transients. To this end, it would be desirable to employ a resonant converter exhibiting substantially lossless switching, such as by the zero-voltage switching technique described in "A Comparison of Half-bridge Resonant Converter Topologies" by R. L. Steigerwald, IEEE Transactions on Power Electronics, April 1988, pp. 174–182, which is hereby incorporated by reference, while also providing means for minimizing active device conduction losses, despite substantial input voltage transients.

OBJECTS OF THE INVENTION

Accordingly, an object of the present invention is to provide a new and improved high-efficiency, high-density power supply suitable for use in a distributed power system.

Another object of the present invention is to provide a power supply exhibiting relatively low active device conduction losses as well as substantially zero switching losses, even for an input voltage having a wide voltage transient envelope.

Another object of the present invention is to provide a high-efficiency, high-density, power supply including a dc-to-dc converter and a boost power supply for maintaining the effective input voltage to the converter within a predetermined range, even if the input voltage to the power supply may exhibit substantial transients, so as to avoid substantial active device conduction losses.

Still another object of the present invention is to provide a high-efficiency, high-density power supply including a dc-to-dc converter and an integral boost power supply for maintaining the effective input voltage to the converter within a predetermined range, such a power supply being implemented with a minimal number of additional circuit components.

SUMMARY OF THE INVENTION

The foregoing and other objects of the present invention are achieved in a power supply including a dc-to-dc converter with an integral boost power supply for maintaining the effective converter input voltage within a predetermined steady-state range, even if the input voltage to the power supply exhibits substantial voltage transients. The boost supply is coupled in series with the input voltage source and is activated only during the input voltage transients. According to a preferred embodiment, the boost power supply comprises the secondary winding of a boost transformer and a rectifier coupled in series with two parallel-connected converter modules. The converter modules each comprise either a half-bridge or a full-bridge connection of switching devices. The primary winding of the boost transformer is coupled between the junctions joining the switching devices in each bridge converter module. In operation, the converter modules are controlled by either pulse width modulation (PWM) or resonant operation to generate a voltage across the primary winding of the boost transformer.

In one preferred embodiment, each converter module comprises a resonant converter including: two switching devices connected in a half-bridge configuration, a resonant circuit including an inductor and a capacitor coupled at the junction between the switching devices, and an output voltage rectifier. Alternatively, each converter module may comprise a full-bridge configuration of switching devices. The primary winding of the boost transformer is coupled between the junctions joining the switching devices of each converter module. Resonant operation of the pair of converter modules results in current sharing therebetween. Preferably, the output voltage of the power supply is regulated by frequency control, while the boost power supply is controlled using phase-shift control of the resonant converter modules. Moreover, if full-bridge converter modules are employed, the power supply output voltage can be controlled using a combination of frequency control and phase-shift control.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
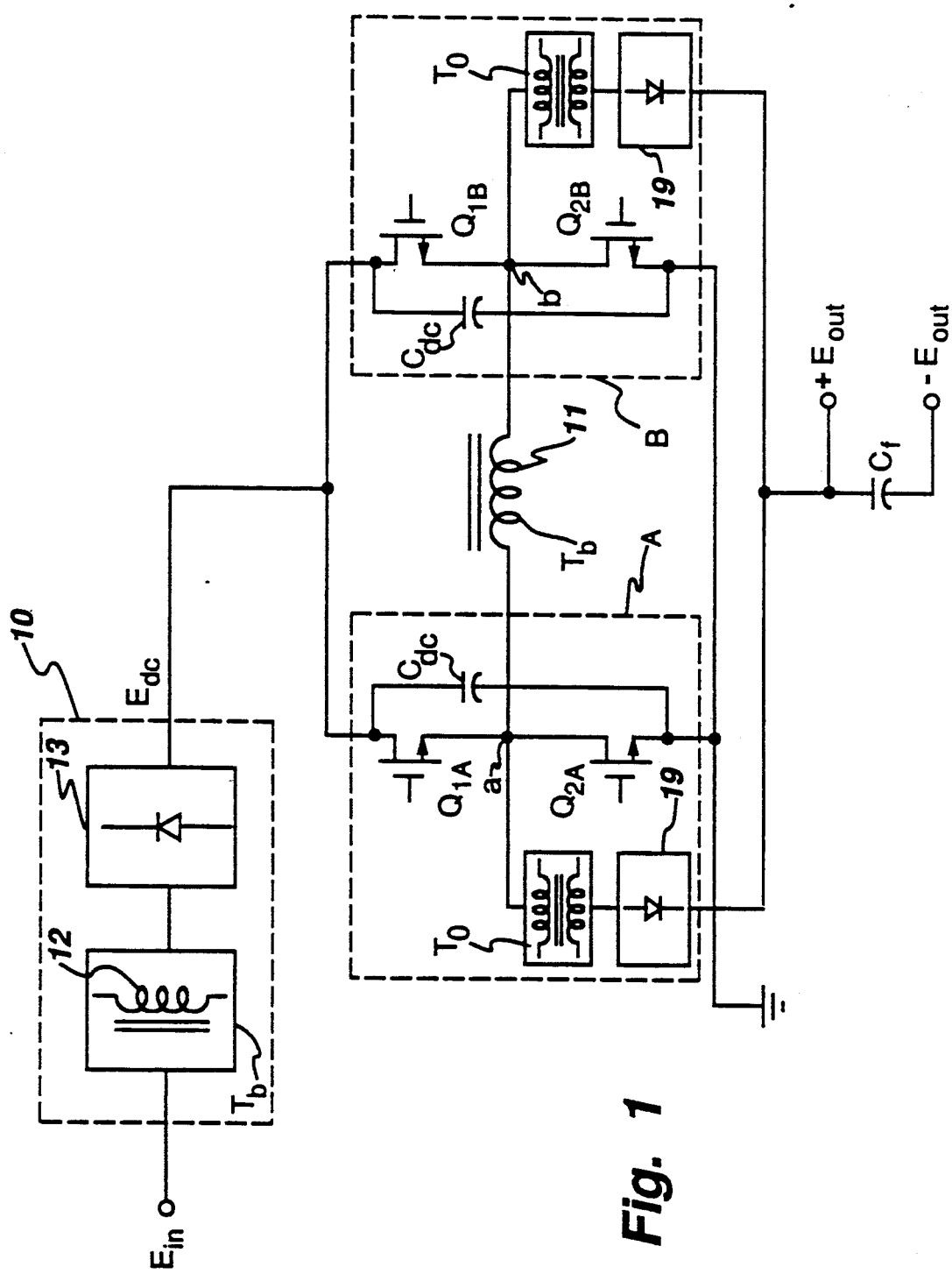
FIG. 1 is a partly schematic, block diagram of a high-efficiency, high-density, power supply in accordance with the present invention.

FIG. 1 is a partly schematic, block diagram of a high-efficiency, high-density, power supply in accordance with the present invention. Two parallel-coupled converter modules A and B are connected in series with a boost power supply 10. Each converter module comprises a half-bridge connection of switching devices, as shown, although a full-bridge connection may alternatively be employed. Moreover, each converter module A and B may comprise either a resonant converter or a PWM converter. In particular, although operation of resonant converter modules are described in detail hereinbelow to illustrate the principles of the present invention, these principles are equally applicable to PWM converters, the operation of which is a matter well-known to those of ordinary skill in the art. In FIG. 1, for purposes of illustration, each converter module is shown as comprising two switching devices $Q_{1A}$-$Q_{2A}$ and $Q_{1B}$-$Q_{2B}$, respectively, connected in a half-bridge configuration with a corresponding junction a and b, respectively, therebetween. Switching devices $Q_{1A}$, $Q_{2A}$, $Q_{1B}$ and $Q_{2B}$ are shown in FIG. 1 as MOSFET's, but other suitable types of switching devices may be used, such as bipolar junction transistors (BJT's), insulated gate bipolar transistors (IGBT's), or MOS-controlled thyristors (MCT's). A filter capacitor $C_{dc}$ is coupled across each half-bridge connection of switching devices $Q_{1A}$-$Q_{2A}$ and $Q_{1B}$-$Q_{2B}$, respectively. Each converter module A and B further includes an output transformer $T_o$ and an output full-wave or half-wave rectifier 19 coupled at junctions a and b, respectively. The primary winding 11 of a boost transformer $T_b$ is coupled between junctions a and b. Boost power supply 10 comprises the secondary winding 12 of boost transformer $T_b$ coupled to a full-wave or half-wave rectifier 13.

In accordance with the present invention, a phase shift is generated between the voltages at junctions a and b so as to induce a voltage $V_{ab}$ across the primary winding 11 of boost transformer $T_b$. The induced voltage $V_{ab}$ is transformed to the secondary winding 12 of boost transformer $T_b$. The voltage across the secondary winding 12 is rectified by rectifier 13 and acts to boost the input voltage $E_{in}$, thereby maintaining the converter input voltage $E_{dc}$ within the steady-state voltage range. A regulated output voltage $E_{out}$ is taken across an output filter capacitor $C_f$.

Figure 2:
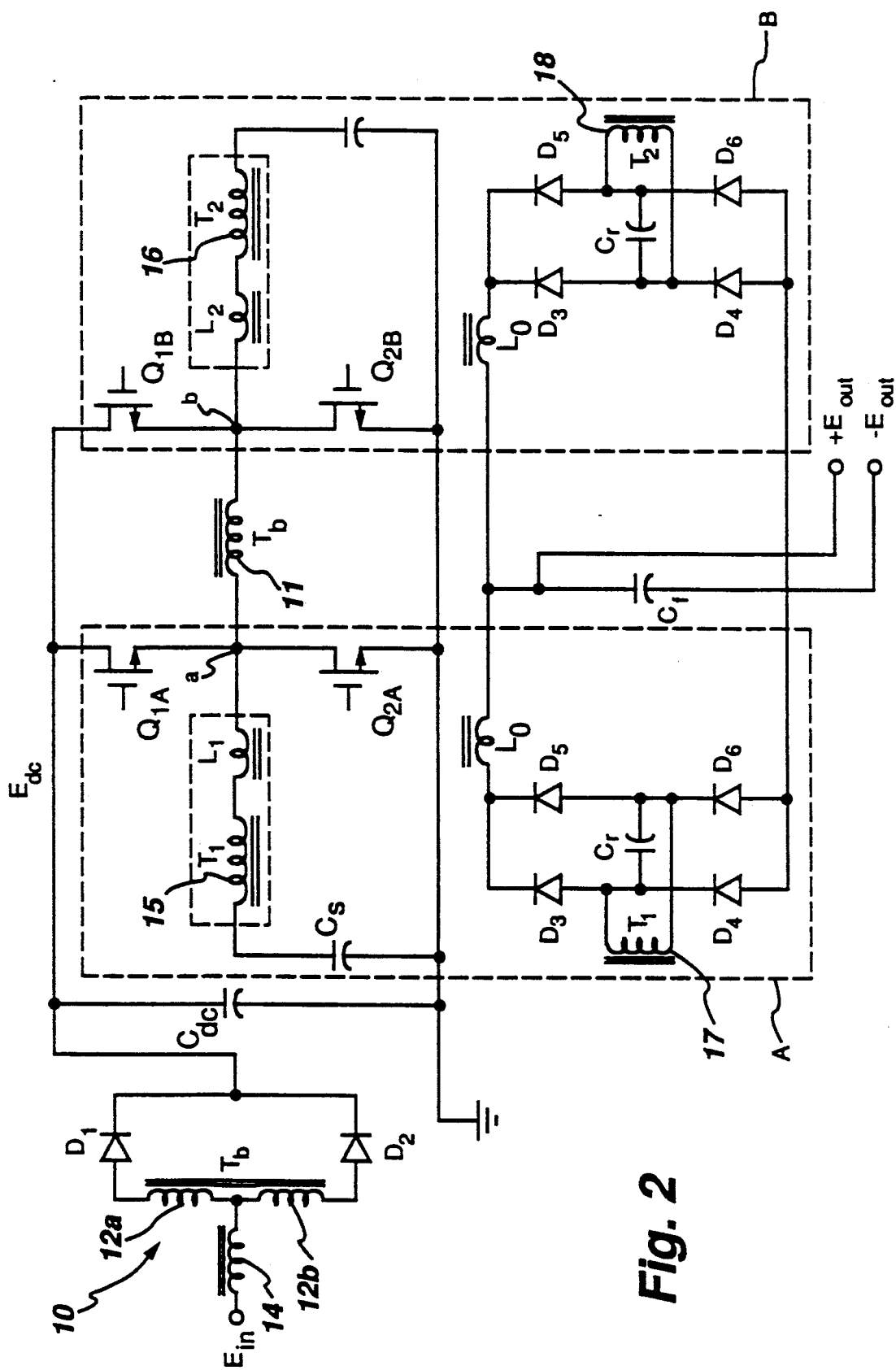
FIG. 2 is a schematic illustration of a high-efficiency, high-density, power supply employing half-bridge resonant converter modules in accordance with one preferred embodiment of the present invention.

FIG. 2 is a schematic illustration of a high-efficiency, high-density, power supply in accordance with one preferred embodiment of the present invention. Parallel-connected converter modules A and B each comprise a half-bridge resonant converter connected in series with boost power supply 10. (Although resonant converter modules A and B are illustrated as parallel-loaded resonant converters, it is to be understood that the principles of the present invention are equally applicable to series resonant converters and combination series/parallel resonant converters.) The boost power supply receives the power supply input voltage $E_{in}$ via an input filter inductor 14. As illustrated, boost transformer $T_b$ preferably has a center-tapped secondary winding 12a-12b coupled to the anodes of half-wave rectifying diodes $D_1$ and $D_2$. DC filter capacitor $C_{dc}$ is illustrated in FIG. 2 as being coupled between the output terminal of boost power supply 10 and ground. The primary winding 11 of boost transformer $T_b$ is coupled between junctions a and b of the resonant circuit modules A and B, respectively. Converter modules A and B each employ a resonant circuit including a resonant capacitance $C_r$ coupled in series with a resonant inductance $L_1$ and $L_2$, respectively, via transformer coupling. In particular, the primary winding 15 and 16, respectively, of a respective transformer $T_1$ and $T_2$ is coupled in series with the corresponding resonant inductance $L_1$ and $L_2$, respectively; and the secondary winding 17 and 18, respectively, of the respective transformer $T_1$ and $T_2$ is coupled in parallel with the corresponding resonant capacitance $C_r$. If desired, the resonant inductances $L_1$ and $L_2$ can be provided by the leakage inductances of transformers $T_1$ and $T_2$, respectively. A dc blocking capacitor $C_s$ is coupled in series with the primary windings of transformers $T_1$ and $T_2$. The secondary winding 17 and 18, respectively, of each respective transformer $T_1$ and $T_2$ is coupled to an output full-wave rectifier comprising diodes $D_3$-$D_6$. As shown, the resonant capacitance $C_r$ for each respective resonant circuit is preferably coupled across the corresponding output rectifier. (If the capacitance value of dc blocking capacitors $C_s$ is much larger than that of resonant capacitors $C_r$, then converter modules A and B operate as parallel resonant converters. On the other hand, if the capacitance value of dc blocking capacitors $C_s$ is on the order of that of resonant capacitors $C_r$, then converter modules A and B operate as combination series/parallel resonant converters.) A small filter inductor $L_o$ is coupled in series with each output rectifier, the other terminal of which inductor is coupled to filter capacitor $C_f$. The regulated output voltage $E_{out}$ is obtained across filter capacitor $C_f$.

In accordance with the present invention, if the input voltage $E_{in}$ is within a steady-state voltage range, e.g.

250 to 280 Vdc, then boost power supply 10 is inactive. On the other hand, if there is a transient voltage drop in the input supply voltage $E_{in}$, then the boost power supply is activated to ensure that the converter input voltage $E_{dc}$ is maintained within the steady-state voltage range. Advantageously, the boost power supply is excited by the resonant converter switching devices; hence, no additional switching devices are required to implement the boost power supply. Moreover, since the resonant converter modules A and B employ secondary-side resonant capacitors $C_r$, transformers $T_1$ and $T_2$ can be advantageously implemented using transformers with relatively high leakage inductances. As hereinabove mentioned, resonant inductances $L_1$ and $L_2$ may be built into transformers $T_1$ and $T_2$ if they are designed to have a sufficiently high leakage inductance. Also as a result of using high-leakage transformers $T_1$ and $T_2$, the primary and secondary windings can be physically separated. In this way, high voltage isolation between the primary and secondary sides of the power supply is easily achieved, a major function of a back-plane supply, for example. Still another advantage of the resonant power supply topology of FIG. 2 is that each of the parallel-connected resonant converter modules supplies one-half of the output power so that each module can advantageously be implemented using relatively small components, resulting in efficient high-frequency operation. Furthermore, by using parallel-connected resonant converter modules A and B, the power supply is capable of generating one-half of its rated power even if one of the converter modules should fail. Still further, operation of such converter modules connected in parallel is relatively simple, since the resonant operation of the two modules tends to have a ballasting effect, resulting in current sharing therebetween.

Figure 3A:
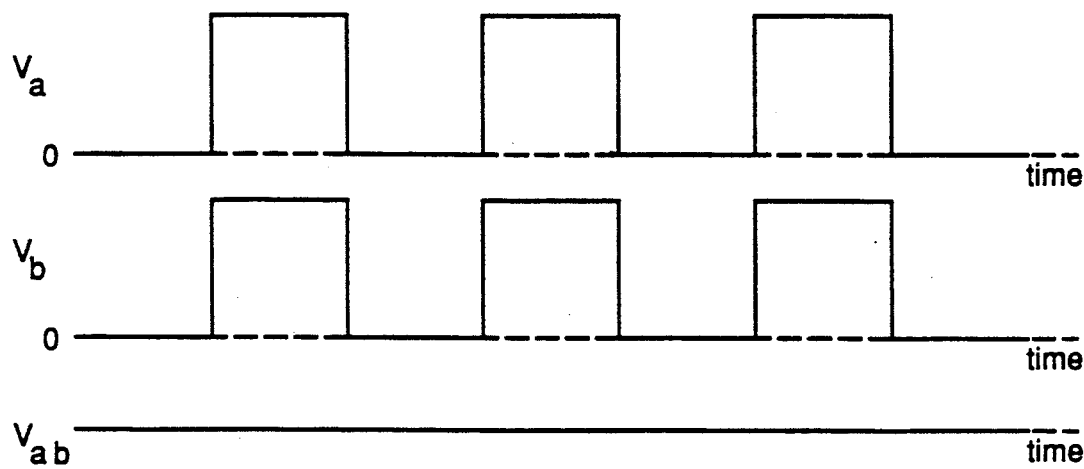
FIG. 3 graphically represents the output voltages from the resonant converter modules and the voltage across the boost transformer for: 3(a) steady-state operation wherein the boost power supply is inactive; and 3(b) transient operation wherein the boost power supply generates a phase shift between the output voltages of the resonant converter modules in accordance with the present invention.

Resonant converter modules A and B are preferably driven by a voltage-controlled oscillator (VCO), as described in detail hereinbelow, the frequency of which is controlled by an error amplifier in order to regulate the output voltage $E_{out}$. If the input voltage $E_{in}$ is within the steady-state voltage range, then boost power supply 10 is inactive. In such case, switching devices $Q_{1A}$-$Q_{2A}$ and $Q_{1B}$-$Q_{2B}$ of resonant converter modules A and B, respectively, are switched so as to maintain voltage $V_{ab}$ across the primary winding 11 of boost transformer $T_b$ at zero, as shown in FIG. 3a, thus maintaining the voltage across the secondary winding 12a-12b at zero. In particular, switching devices $Q_{1A}$ and $Q_{1B}$ are gated on and off together, and switching devices $Q_{2A}$ and $Q_{2B}$ are gated on and off together. Hence, the steady-state dc input current splits between boost diodes $D_1$ and $D_2$ and the secondary windings 12a and 12b of boost transformer $T_b$. Advantageously, the ac component of the steady-state input current is small, resulting in negligible high-frequency losses in the secondary windings of the boost transformer.

Figure 3B:
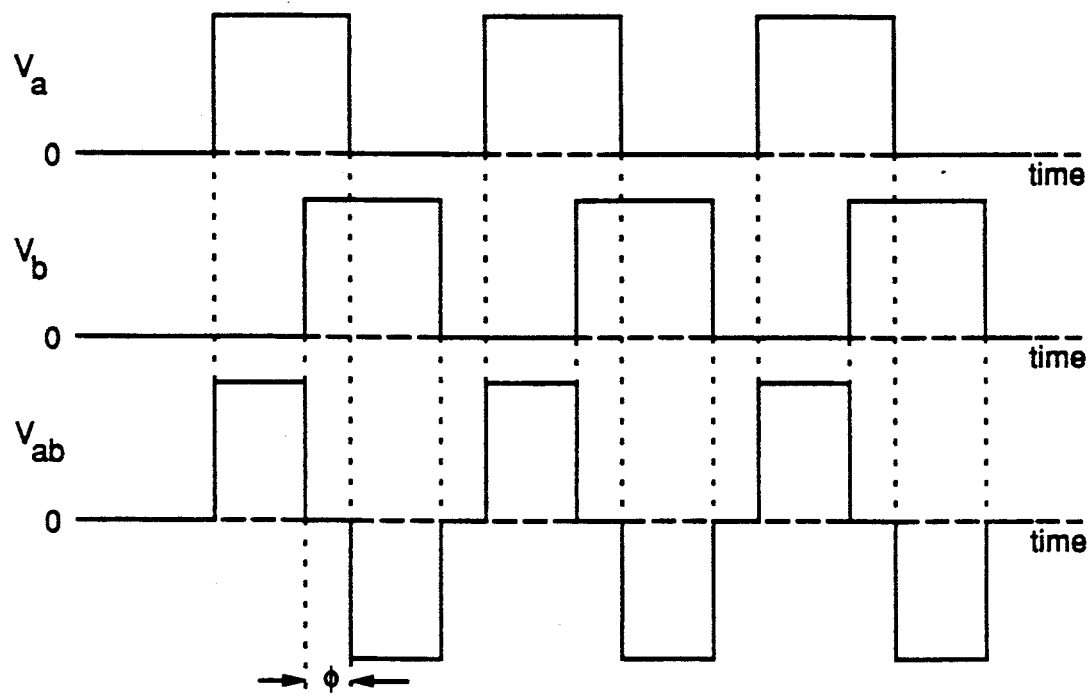

If there is a transient drop in the input supply voltage $E_{in}$ below the steady-state lower limit, then boost supply 10 is activated, as described hereinbelow, to maintain the converter input voltage $E_{dc}$ within the steady-state voltage range. In particular, the gating of switching devices $Q_{1A}$, $Q_{1B}$, $Q_{2A}$ and $Q_{2B}$ is controlled so as to generate a phase shift $\phi$ between junctions a and b, i.e. across the primary winding of boost transformer $T_b$, as shown in FIG. 3b. The phase shift $\phi$ can be varied in the range from zero to 180°, depending on the voltage needed to boost the input voltage $E_{in}$ to maintain the converter input voltage $E_{dc}$ within the steady-state voltage range. For example, for maximum output voltage from boost supply 10, switching devices $Q_{1A}$ and $Q_{2B}$ are gated on and off together, and switching devices $Q_{1B}$ and $Q_{2A}$ are gated on and off together, thereby generating a 180° phase shift. As a result, the voltage $V_{ab}$ obtained cross the primary winding of boost transformer $T_b$ is rectified by boost diodes $D_1$ and $D_2$ to provide the maximum voltage boost to the converter input voltage $E_{dc}$ so as to maintain it within the steady-state voltage range.

In accordance with the present invention, the phase shift $\phi$ is independent of the resonant converter operating frequency. Thus, the output voltage $E_{out}$ is maintained by frequency control of the resonant converter modules even during a transient drop in the input voltage $E_{in}$. Moreover, the frequency control loop should be substantially faster than the phase shift control loop. That is, while the boost phase shift control must respond in a relatively short time, e.g. on the order of a few milliseconds, an input voltage transient can last for a comparatively long time, e.g. 80 msec. Thus, for a converter operating at 1 MHz, for example, any disturbance in the output voltage $E_{out}$ that may be caused by a phase shift adjustment for controlling the boost supply is easily removed by the frequency control loop. Advantageously, since the boost power supply only operates when there is a transient drop in the supply input voltage $E_{in}$, operation of the boost power supply has a negligible effect on overall power supply efficiency during steady-state operation.

Figure 4:
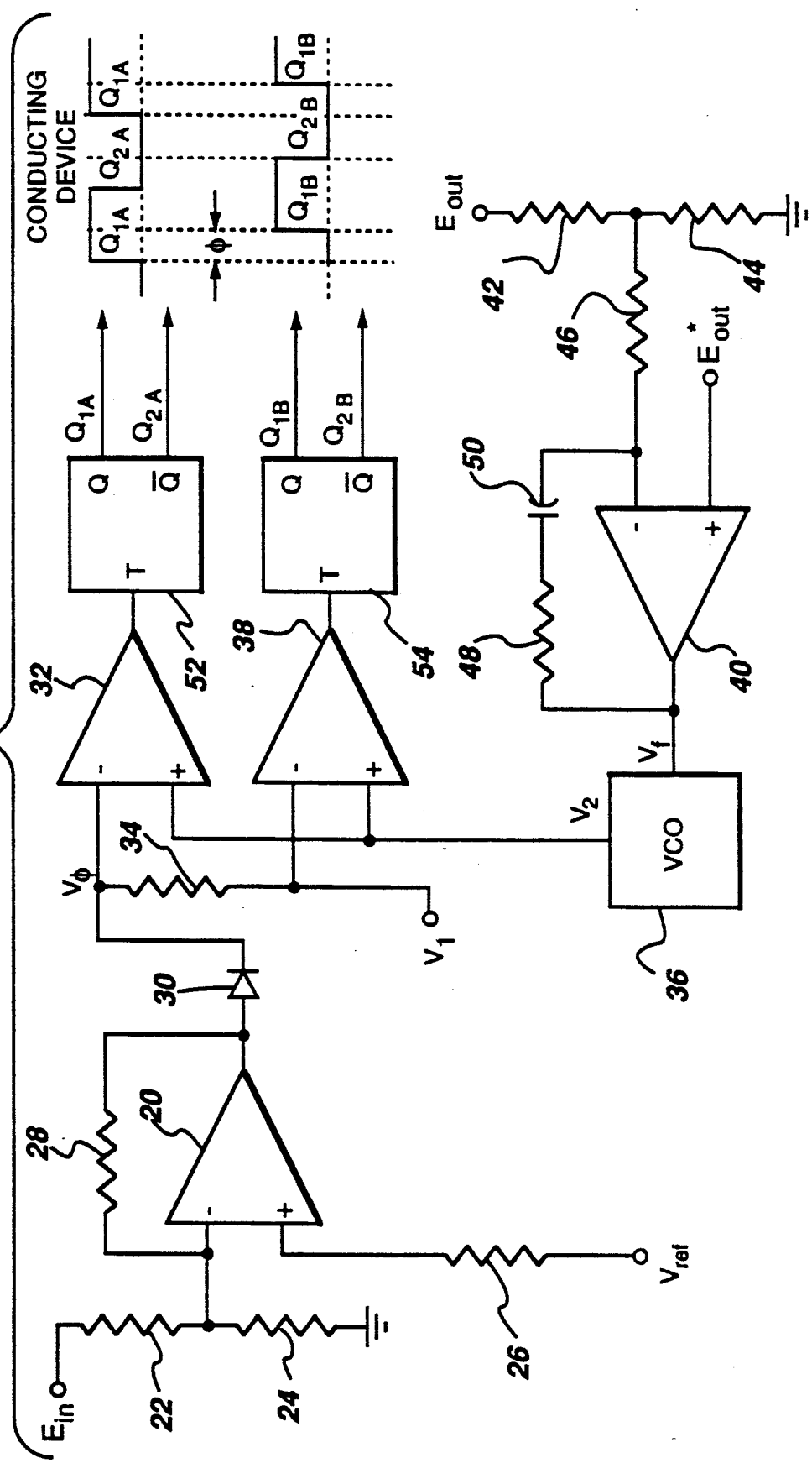
FIG. 4 is a schematic illustration of a controller for controlling the operation of the power supply of FIG. 2 in accordance with a preferred embodiment of the present invention.

FIG. 4 illustrates a preferred embodiment of a feed-forward controller for controlling the operation of the power supply of FIG. 2. An operational amplifier 20 receives the power supply input voltage $E_{in}$ at its inverting input via a voltage divider comprising resistors 22 and 24. The noninverting input of operational amplifier 20 is coupled to a reference voltage $V_{ref}$ via a resistor 26. Resistors 22 and 24 are also coupled to the output terminal of operational amplifier 20 via a feedback resistor 28. The anode of a diode 30 is also coupled to the output terminal of operational amplifier 20. The cathode of diode 30 is coupled to the inverting input of a comparator 32. The voltage at the inverting input of comparator 32 comprises a voltage $V_\phi$, which, when diode 30 is conducting, is proportional to the phase shift $\phi$ between the two resonant converter modules A and B and is derived through a resistor 34 from a predetermined voltage $V_1$, the value of which is set to provide 50% duty cycle gate drive signals to each respective switching device when the input voltage $E_{in}$ is within its steady-state voltage range (i.e. when diode 30 is reverse-biased). The noninverting input of comparator 32 receives the output voltage $V_2$ from a VCO 36. Another comparator 38 receives the output voltage $V_2$ from VCO 36 at its noninverting input and the predetermined voltage $V_1$ at its inverting input. The output voltage $V_2$ from VCO 36 is a constant amplitude sawtooth waveform, the frequency of which is controlled by the output voltage $V_f$ from an error amplifier 40. The inverting input of error amplifier 40 receives the power supply output voltage $E_{out}$ via a voltage dividing network of resistors 42 and 44 and another resistor 46 coupled in series therewith. The output terminal of error amplifier 40 is coupled to its inverting input via a feedback resistor 48 and a feedback capacitor 50. The noninverting input of the error amplifier receives a commanded output voltage $E_{out}^*$. The output voltages from comparators 32 and 38 are respectively coupled to positive-edge triggered toggle flip-flops 52 and 54, respectively, which provide the gate drive signals to switching devices $Q_{1A}$ and $Q_{2A}$ of resonant converter module A and switching devices $Q_{1B}$ and $Q_{2B}$ of resonant converter module B, respectively, as shown.

In operation, if the input voltage $E_{in}$ is within its steady-state voltage range, then the voltage $E_{in}$ is not low enough relative to the reference voltage $V_{ref}$ to require activation of the boost power supply. As a result, diode 30 at the output terminal of operational amplifier 20 is reverse-biased. In this case, the output voltage from operational amplifier 20 has no effect on the voltage $V_\phi$ at the inverting input of comparator 32, and the gate drive signals to switching devices $Q_{1A}$, $Q_{2A}$, $Q_{1B}$ and $Q_{2B}$ are Controlled by the frequency control loop to have a 50% duty cycle with no phase shift between the output voltages of the two resonant converter modules A and B.

On the other hand, if the input voltage $E_{in}$ exhibits a transient drop in voltage below the lower limit of the steady-state voltage range, then the output voltage from operational amplifier 20 increases, thus forward-biasing diode 30 and causing the voltage $V_\phi$ to increase which, in turn, causes the phase shift $\phi$ between the resonant converter modules A and B to increase. The result, in reference to the circuit shown in FIG. 2, is an increase in voltage $V_{ab}$ across the primary winding 11 of boost transformer $T_b$ proportional to the phase shift $\phi$. The voltage $V_{ab}$ is transformed to the secondary winding 12 of boost transformer $T_b$ and is rectified by boost diodes $D_1$ and $D_2$ to maintain the input converter voltage $E_{dc}$ within the steady-state voltage range. During the time in which the boost supply is operating, the frequency control loop comprising VCO 36, shown in FIG. 4, maintains regulation of output voltage $E_{out}$.

Figure 5:
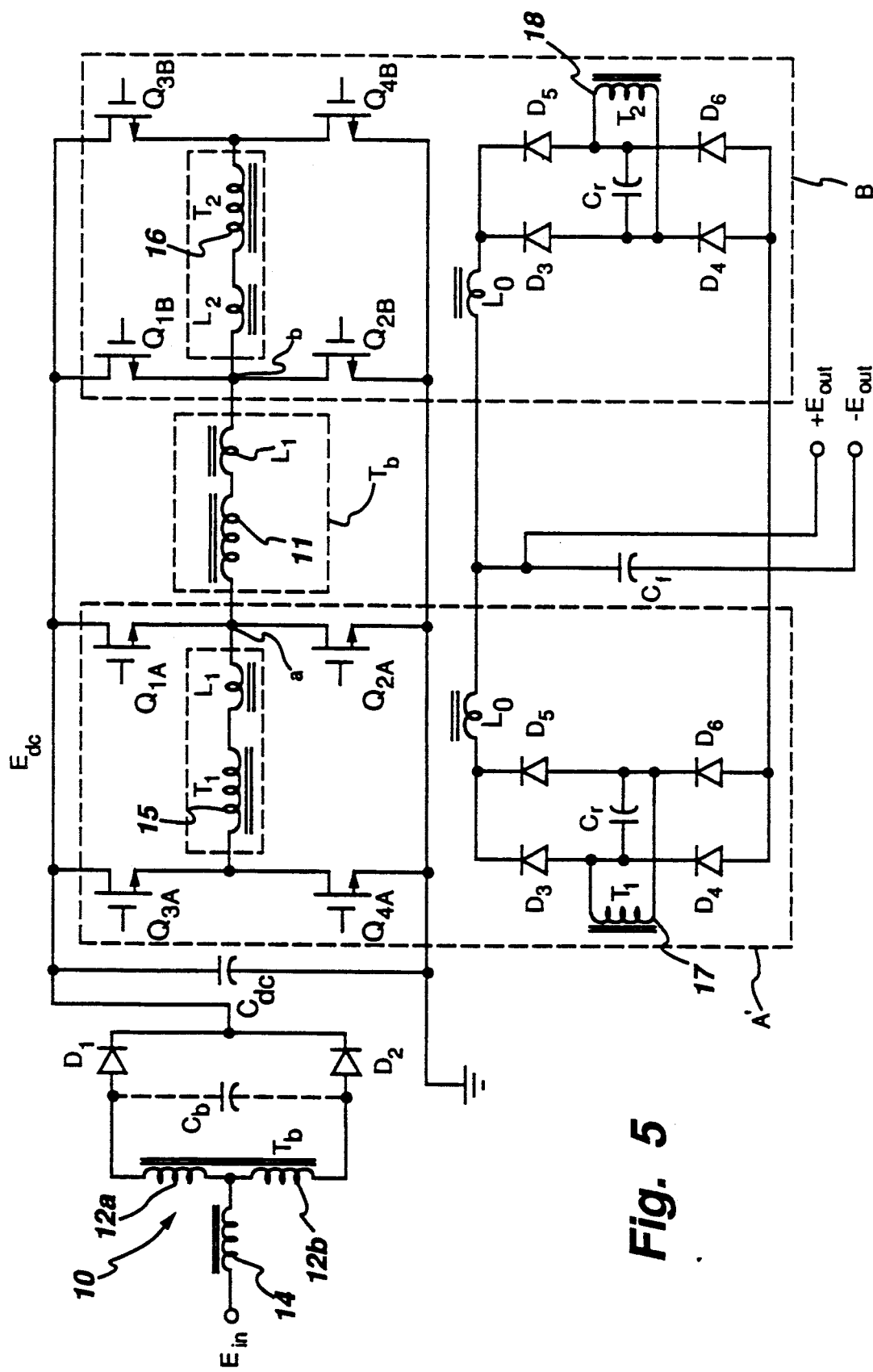
FIG. 5 is a schematic illustration of a high-efficiency, high-density, power supply employing full-bridge resonant converter modules in accordance with an alternative embodiment of the present invention.

FIG. 5 illustrates an alternative embodiment of the present invention wherein resonant converter modules A' and B' each comprise a full-bridge connection of switching devices, i.e. two converter legs. Specifically, resonant converter module A' includes series-connected switching devices $Q_{1A}$ and $Q_{2A}$ coupled in parallel with series-connected switching devices $Q_{3A}$ and $Q_{4A}$. Similarly, resonant converter module B' includes series-connected switching devices $Q_{1B}$ and $Q_{2B}$ coupled in parallel with series-connected switching devices $Q_{3B}$ and $Q_{4B}$. Switching devices $Q_{1A}$-$Q_{4A}$ and $Q_{1B}$-$Q_{4B}$ are shown in FIG. 4 as MOSFET's, but other suitable types of switching devices may be used, such as BJT's, IGBT's, or MCT's.

Although the full-bridge embodiment of FIG. 5 requires twice as many switching devices as the half-bridge version of FIG. 2, each device must carry only half the current as in the half-bridge version. Moreover, the full-bridge version provides an additional degree of control. In particular, the individual legs in each converter module can be phase-shifted with respect to each other in order to control the voltages applied to the respective resonant circuits. For example, in converter module A', the converter leg defined by switching devices $Q_{3A}$ and $Q_{4A}$ can be phase-shifted with respect to the converter leg defined by switching devices $Q_{1A}$ and $Q_{2A}$. In this way, a rectangular voltage waveform of controllable duty cycle is applied to each respective resonant circuit. Preferably, the phase shift between the respective converter module legs is controlled directly by feeding forward the converter input voltage $E_{dc}$ to the control to get substantially instantaneous dc ripple rejection, thereby improving the audio-susceptibility performance. A suitable control for operating a full-bridge converter using a combination of frequency control and phase-shift control is described in commonly assigned U.S. Pat. No. 4,672,528 of J. N. Park and R. L. Steigerwald, issued June 9, 1987, which patent is incorporated by reference herein. Advantageously, since the output voltage $E_{out}$ can be controlled in the embodiment of FIG. 5 using a combination of frequency and phase-shift control, the frequency range over which the power supply must operate can be reduced. Moreover, by using phase-shift control, i.e. pulse width modulation, of the full-bridge converter modules A' and B', boost power supply 10 can function to maintain the converter input voltage $E_{dc}$ within its steady-state voltage range during both transient increases and drops in the power supply input voltage $E_{in}$.

In another alternative embodiment of the present invention, boost power supply 10 may comprise a resonant power supply. Such a resonant boost power supply would be controlled by phase-shift control between junctions a and b in accordance with the present invention. An exemplary implementation of a resonant boost power supply includes a boost supply resonant capacitance $C_b$, as illustrated in phantom in FIG. 5, and a resonant inductance which preferably comprises the leakage inductance L1 of boost transformer $T_b$. Alternatively, a discrete inductance may be coupled in series with the primary winding of boost transformer $T_b$. Operation of a resonant power supply by phase-shift control is described in U.S. Pat. No. 4,672,528, cited hereinabove.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A high-efficiency, high-density power supply, comprising:
   two converter modules coupled in parallel to each other, each said converter module comprising at least one pair of switching devices coupled together in a half-bridge configuration;
   converter control means for regulating the output voltage of said power supply;
   boost power supply means having a boost supply output voltage coupled in series with a power supply input voltage and with said converter modules, said boost power supply means maintaining an input voltage applied to said converter modules within a predetermined range of steady-state voltages; and
   boost control means for activating said boost power supply means by controlling said switching devices in order to boost the input voltage applied to said converter modules only when said power supply input voltage is outside said predetermined range of steady-state voltages.

2. The power supply of claim 1 wherein said boost power supply means comprises:
   a boost transformer having at least one secondary winding for receiving said power supply input voltage and further having a primary winding coupled between a pair of junctions joining the respective pairs of switching devices of said converter modules.

3. The power supply of claim 2 wherein said boost transformer comprises a center-tapped secondary winding divided into two windings with substantially the same number of turns, each of the outer portions of said center-tapped secondary winding, respectively, being coupled in series with a rectifying diode.

4. The power supply of claim 2 wherein said boost control means comprises phase shifting means for generating a phase shift between the voltages at the junctions joining the respective pairs of switching devices of said converter modules so as to induce a boost voltage across the primary winding of said boost transformer, said boost voltage being proportional to said phase shift.

5. The power supply of claim 4 wherein said phase shifting means comprises feedforward control means for receiving said power supply input voltage and generating said phase shift when said power supply input voltage decreases below a predetermined low voltage limit, said phase shift being substantially equal to zero when said power supply input voltage is greater than said low voltage limit.

6. The power supply of claim 1 wherein each of said converter modules comprises two of said pairs of switching devices coupled together in a half-bridge configuration so as to form a full-bridge configuration.

7. The power supply of claim 6 wherein said converter control means further comprises pulse width modulation means for generating a phase shift between the two half-bridges of said full-bridge configuration.

8. The power supply of claim 1 wherein each of said converter modules comprises a PWM converter.

9. The power supply of claim 1 wherein each of said converter modules comprises a resonant converter and wherein said converter control means comprises frequency control means for controlling the frequency of said switching devices.

10. The power supply of claim 2 wherein said boost power supply means further comprises a resonant circuit including a resonant boost capacitance coupled to a resonant boost inductance.

11. The power supply of claim 10 wherein said resonant boost inductance comprises the leakage inductance of said boost transformer.

12. A high-efficiency, high-density power supply, comprising:
two resonant converter modules coupled in parallel to each other, each said resonant converter module comprising at least one pair of switching devices coupled together in a half-bridge configuration and a resonant circuit including at least one resonant inductor and a resonant capacitor coupled at the junction between the respective pair of said switching devices, each said resonant converter module further comprising an output voltage rectifier coupled to said resonant circuit;
converter control means for regulating the output voltage of said power supply by controlling the frequency of said switching devices;
boost power supply means having a boost supply output voltage coupled in series with a power supply input voltage and with said resonant converter modules, said boost power supply means maintaining an input voltage applied to said resonant converter modules within a predetermined range of steady-state voltages; and
boost control means for activating said boost power supply means by controlling said switching devices in order to boost the input voltage applied to said converter modules only when said power supply input voltage is outside said predetermined range of steady-state voltages.

13. The power supply of claim 12 wherein said boost power supply means comprises:
a boost transformer having at least one secondary winding for receiving said power supply input voltage and further having a primary winding coupled between a pair of junctions joining the respective pairs of switching devices of said resonant converter modules.

14. The power supply of claim 13 wherein said boost transformer comprises a center-tapped secondary winding divided into two windings with substantially the same number of turns, each of the outer portions of said center-tapped secondary winding, respectively, being coupled in series with a rectifying diode.

15. The power supply of claim 13 wherein said boost control means comprises:
phase shifting means for generating a phase shift between the voltages at the junctions joining the respective pairs of switching devices of said resonant converter modules so as to induce a boost voltage across the primary winding of said boost transformer, said boost voltage being proportional to said phase shift.

16. The power supply of claim 15 wherein said phase shifting means comprises feedforward control means for receiving said power supply input voltage and generating said phase shift when said power supply input voltage decreases below a predetermined low voltage limit, said phase shift being substantially equal to zero when said power supply input voltage is greater than said low voltage limit.

17. The power supply of claim 12 wherein each of said resonant converter modules comprises two of said pairs of switching devices coupled together in a half-bridge configuration so as to form a full-bridge configuration.

18. The power supply of claim 17 wherein said converter control means further comprises pulse width modulation means for generating a phase shift between the two half-bridges of said full-bridge configuration.

19. The power supply of claim 13 wherein said boost power supply means further comprises a resonant circuit including a resonant boost capacitance coupled to a resonant boost inductance.

20. The power supply of claim 19 wherein said resonant boost inductance comprises the leakage inductance of said boost transformer.

* * * * *